(No Model.)
W. K. HARRELL.
DEVICE FOR FORMING CALKS ON HORSESHOES.
No. 266,139. Patented Oct. 17, 1882.
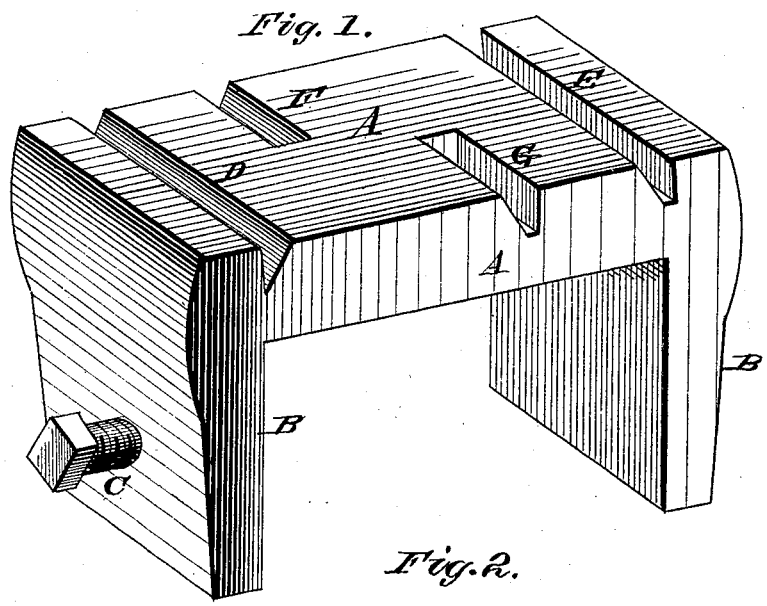
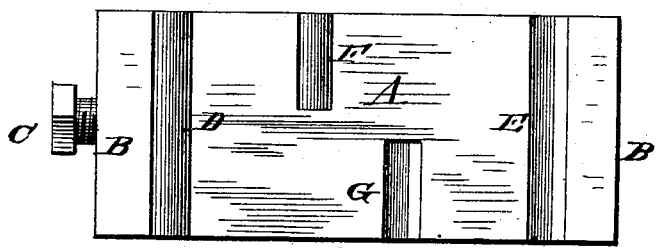
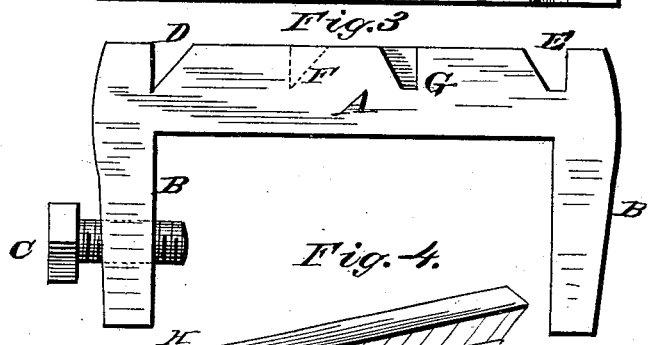
WITNESSES
INVENTOR
William K. Harrell,
by Louis Bagger & Co.,
Attorneys

United States Patent Office.

WILLIAM K. HARRELL, OF CLARINDA, IOWA.

DEVICE FOR FORMING CALKS ON HORSESHOES.

SPECIFICATION forming part of Letters Patent No. 266,139, dated October 17, 1882.

Application filed April 24, 1882. (No model.)

*To all whom it may concern:*

Be it known that I, WILLIAM K. HARRELL, of Clarinda, in the county of Page and State of Iowa, have invented certain new and useful Improvements in Devices for Forming Calks upon Horseshoes; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view. Fig. 2 is a top plan. Fig. 3 is a side view, and Fig. 4 is a view of the toe-calk bar.

Corresponding parts in the several figures are denoted by like letters of reference.

This invention relates to devices for forming calks upon horseshoes; and it consists in certain improvements in the construction of the same, which will be hereinafter fully described, and particularly pointed out in the claim.

In the drawings hereto annexed, A represents a solid block of iron or steel, provided upon its under side with downward-projecting arms B B, one of which has a set-screw, C, by means of which the device may be clamped and firmly secured upon an ordinary anvil, the block or body A resting upon the face of the latter. In the face of the block A, near the ends, are formed two transverse grooves, D E, adapted to receive the toe-calks while being welded to the shoe, one of said grooves, D, being sharp or nearly V-shaped in cross-section, so as to accommodate the sharp calks required for winter use or in frosty and sleety weather. The other groove, E, is more blunt, as shown, so as to adapt it to hold the calks generally used in summer, when the roads are in good condition. Adjoining the grooves D E are formed shorter grooves F G, extending from the edge toward the center of the face of the block A, for the purpose of forming the heel-calks of shoes for winter and summer use, respectively.

H is the toe-calk bar, which may be made of any suitable length, and which is formed in cross-section to the required shape, as shown.

The operation is as follows: When the shoe proper has been made it is placed face side down and the end of the calk-bar thick edge down in the fire, and heated to a welding heat. The operator now takes the calk-bar in the right hand, places the calk in the proper groove, D or E, of the device, (which has been previously secured upon the anvil,) and with the left hand places the toe of the shoe on the calk, with the outer edges even. Then, while letting the end of the calk-bar rest on the face of the anvil, hammer the parts together, thus forcing the calk into perfect shape in the groove in which it is placed, and at the same time welding it to the shoe, around the edges of which any superfluous metal from the calk-bar is forced, thus making the weld exceedingly strong and secure. To form the heel-calks, the ends of the shoe are bent and driven into the proper groove, F or G, where they are formed to the desired shape.

In providing shoes with toe-calks the common practice is to form the calk with a sharp nib or projection, which is driven into the face of the shoe to hold the parts together while being heated to a welding heat. The result is that the outer portions of the shoe and calk are partly consumed or burned out before the adjoining faces are sufficiently hot to be welded. By this invention the adjoining faces are heated separately, thus avoiding this objection. The construction of the device is simple, and it enables the operator to proceed with great rapidity and facility.

Having thus described my invention, I claim and desire to secure by Letters Patent of the United States—

As an improvement in devices for calking horseshoes, the block A, having arms B B, set-screw C, transverse grooves D E, and short grooves F G, extending from the edge toward the center of the face of said block, substantially as and for the purpose set forth.

In testimony that I claim the foregoing as my own I have hereunto affixed my signature in presence of two witnesses.

WILLIAM KING HARRELL.

Witnesses:
G. M. FELTIS,
THOMAS W. CAMP.